US009890788B2

(12) United States Patent
Annati et al.

(10) Patent No.: US 9,890,788 B2
(45) Date of Patent: Feb. 13, 2018

(54) TURBOCHARGER AND METHOD

(71) Applicant: Caterpillar Inc., Peoria, IL (US)

(72) Inventors: Richard E. Annati, Lafayette, IN (US); Gary W. Powers, Lafayette, IN (US); Jeffrey W. McCormack, Fishers, IN (US); Craig Miller, West Bloomfield, MI (US)

(73) Assignee: Caterpillar Inc., Peoria, IL (US)

( * ) Notice: Subject to any disclaimer, the term of this patent is extended or adjusted under 35 U.S.C. 154(b) by 150 days.

(21) Appl. No.: 14/641,676

(22) Filed: Mar. 9, 2015

(65) Prior Publication Data
US 2016/0265542 A1    Sep. 15, 2016

(51) Int. Cl.
| | | |
|---|---|---|
| F02B 33/44 | (2006.01) |
| F04D 29/063 | (2006.01) |
| F02B 37/00 | (2006.01) |
| F04D 25/04 | (2006.01) |
| F04D 29/059 | (2006.01) |
| F04D 29/10 | (2006.01) |
| F04D 29/26 | (2006.01) |
| F04D 29/28 | (2006.01) |

(52) U.S. Cl.
CPC ............ *F04D 29/063* (2013.01); *F02B 37/00* (2013.01); *F04D 25/04* (2013.01); *F04D 29/059* (2013.01); *F04D 29/102* (2013.01); *F04D 29/266* (2013.01); *F04D 29/284* (2013.01); *Y02T 10/144* (2013.01)

(58) Field of Classification Search
CPC .. F04D 25/045; F04D 29/063; F04D 29/4206; F04D 29/056; F04D 25/04; F04D 29/059; F04D 29/102; F04D 29/266; F04D 29/284; F02B 37/00

USPC ......................................................... 60/605.3
See application file for complete search history.

(56) References Cited

U.S. PATENT DOCUMENTS

| | | |
|---|---|---|
| 2,082,379 A | 6/1937 | Brittain, Jr. |
| 2,630,963 A | 3/1953 | Schlichtig |
| 2,717,732 A | 9/1955 | Dailey, Jr. |
| 2,935,294 A | 5/1960 | Angell et al. |
| 3,039,007 A | 6/1962 | Williams et al. |

(Continued)

FOREIGN PATENT DOCUMENTS

| | | |
|---|---|---|
| DE | 10022052 A1 | 3/2001 |
| DE | 102008058507 A1 | 5/2010 |

(Continued)

*Primary Examiner* — Phutthiwat Wongwian
*Assistant Examiner* — Matthew T Largi

(57) ABSTRACT

A turbocharger includes a turbine, a compressor, and a bearing housing forming a bearing bore. A bearing arrangement is disposed between a shaft interconnecting the turbine and compressor wheels, and the bearing housing. The bearing arrangement includes an outer bearing race element that frictionally engages the bearing bore at both ends. At a first end, a bearing retainer that is connected to the bearing housing includes a cylindrical element that extends into the bearing bore and abuts and frictionally engages a first end of the outer bearing race element. The second end of the outer bearing race element abuts and frictionally engages a stop formed at an end of the bearing bore such that no pins or other structures are required for preventing rotation of the outer bearing race element in the bearing bore.

14 Claims, 9 Drawing Sheets

(56) References Cited

U.S. PATENT DOCUMENTS

| | | | |
|---|---|---|---|
| 3,133,693 | A | 5/1964 | Hall |
| 3,390,926 | A | 7/1968 | Woollenweber, Jr. |
| 3,723,022 | A | 3/1973 | Olson |
| 3,887,198 | A | 6/1975 | McClure et al. |
| 4,389,052 | A | 6/1983 | Shimizu et al. |
| 4,721,398 | A * | 1/1988 | Miyashita .............. F01D 25/164 384/466 |
| 4,721,441 | A * | 1/1988 | Miyashita .............. F01D 25/164 384/518 |
| 4,749,334 | A | 6/1988 | Byrne |
| 4,769,993 | A | 9/1988 | Kawamura |
| 4,948,333 | A | 8/1990 | Meer et al. |
| 5,048,978 | A | 9/1991 | Singh |
| 5,228,756 | A | 7/1993 | Krampera |
| 5,253,985 | A | 10/1993 | Ruetz |
| 5,299,909 | A | 4/1994 | Wulf |
| 5,443,362 | A | 8/1995 | Crites et al. |
| 5,454,646 | A | 10/1995 | Reisdorf |
| 5,465,482 | A | 11/1995 | Elvekjaer et al. |
| 5,526,640 | A | 6/1996 | Brooks et al. |
| 5,775,819 | A | 7/1998 | Kinney et al. |
| 5,964,574 | A | 10/1999 | Meier et al. |
| 6,045,266 | A | 4/2000 | Mitsubori et al. |
| 6,120,246 | A | 9/2000 | Auger et al. |
| 6,161,768 | A | 12/2000 | Gordon et al. |
| 6,168,375 | B1 | 1/2001 | LaRue et al. |
| 6,220,234 | B1 | 4/2001 | Baker et al. |
| 6,224,332 | B1 | 5/2001 | Leach et al. |
| 6,264,429 | B1 | 7/2001 | Koeller et al. |
| 6,368,077 | B1 | 4/2002 | Meyerkord et al. |
| 6,371,238 | B1 | 4/2002 | Svihla |
| 6,478,553 | B1 | 11/2002 | Panos et al. |
| 6,481,917 | B1 | 11/2002 | Chen et al. |
| 6,499,884 | B1 | 12/2002 | Svihla et al. |
| 6,530,744 | B2 | 3/2003 | Liotta et al. |
| 6,540,480 | B2 | 4/2003 | Nikpour |
| 6,609,881 | B2 | 8/2003 | Brown et al. |
| 6,612,747 | B1 | 9/2003 | Jones |
| 6,629,556 | B2 | 10/2003 | Decker et al. |
| 6,663,347 | B2 | 12/2003 | Decker et al. |
| 6,669,372 | B1 | 12/2003 | Martin |
| 6,709,232 | B1 | 3/2004 | Vogiatzis |
| 6,733,236 | B2 | 5/2004 | Sumser et al. |
| 6,742,989 | B2 | 6/2004 | Osako et al. |
| 6,754,954 | B1 | 6/2004 | Decker |
| 6,767,185 | B2 | 7/2004 | Martin et al. |
| 6,874,998 | B2 | 4/2005 | Roby |
| 6,877,901 | B2 | 4/2005 | Wollenweber |
| 6,904,949 | B2 | 6/2005 | Decker et al. |
| 6,910,863 | B2 | 6/2005 | Scardicchio et al. |
| 6,928,816 | B2 | 8/2005 | Leavesley |
| 6,942,460 | B2 | 9/2005 | Osako et al. |
| 6,968,702 | B2 | 11/2005 | Child et al. |
| 6,979,172 | B1 | 12/2005 | Mackenzie |
| 6,979,183 | B2 | 12/2005 | Baumann |
| 6,994,526 | B2 | 2/2006 | Furman et al. |
| 7,001,143 | B2 | 2/2006 | Vogiatzis |
| 7,001,155 | B2 | 2/2006 | Cabrales et al. |
| 7,008,182 | B2 | 3/2006 | Kopp et al. |
| 7,010,915 | B2 | 3/2006 | Stilgenbauer |
| 7,040,867 | B2 | 5/2006 | Louthan et al. |
| 7,052,241 | B2 | 5/2006 | Decker |
| 7,063,508 | B2 | 6/2006 | Higashimori et al. |
| 7,066,919 | B1 | 6/2006 | Sauerland et al. |
| 7,086,843 | B2 | 8/2006 | Wild |
| 7,097,411 | B2 | 8/2006 | Smoke et al. |
| 7,104,693 | B2 | 9/2006 | Mavrosakis |
| 7,118,335 | B2 | 10/2006 | Vacarezza et al. |
| 7,147,433 | B2 | 12/2006 | Ghizawi |
| 7,204,671 | B2 | 4/2007 | Dellmann |
| 7,214,037 | B2 | 5/2007 | Mavrosakis |
| 7,232,258 | B2 | 6/2007 | Garcia |
| 7,241,416 | B2 | 7/2007 | Sweetland |
| 7,260,892 | B2 | 8/2007 | Schilling et al. |
| 7,329,048 | B2 | 2/2008 | Klusman et al. |
| 7,344,362 | B2 | 3/2008 | Kopp et al. |
| 7,384,236 | B2 | 6/2008 | Meier et al. |
| 7,401,980 | B2 | 7/2008 | Krauss et al. |
| 7,419,304 | B2 | 9/2008 | Mavrosakis |
| 7,428,814 | B2 | 9/2008 | Pedersen et al. |
| 7,461,507 | B2 | 12/2008 | Arnold et al. |
| 7,461,979 | B2 | 12/2008 | Mavrosakis |
| 7,478,532 | B2 | 1/2009 | Martin et al. |
| 7,484,932 | B2 | 2/2009 | Aguilar |
| 7,517,154 | B2 | 4/2009 | McKeirnan, Jr. |
| 7,568,883 | B2 | 8/2009 | Arnold et al. |
| 7,600,969 | B2 | 10/2009 | Frankenstein et al. |
| 7,631,497 | B2 | 12/2009 | Panek |
| 7,677,041 | B2 | 3/2010 | Woollenweber |
| 7,686,586 | B2 | 3/2010 | Nikpour |
| 7,722,336 | B2 | 5/2010 | Vaccarezza et al. |
| 7,766,550 | B2 | 8/2010 | Larue |
| 7,771,162 | B2 | 8/2010 | Castan |
| 7,771,170 | B2 | 8/2010 | Seiler |
| 7,793,494 | B2 | 9/2010 | Wirth et al. |
| 7,797,936 | B2 | 9/2010 | Hayashi et al. |
| 7,798,770 | B2 | 9/2010 | Sumser et al. |
| 7,837,448 | B2 | 11/2010 | Shimizu et al. |
| 7,845,900 | B2 | 12/2010 | Roduner et al. |
| 7,874,136 | B2 | 1/2011 | Heyerman |
| 7,878,758 | B2 | 2/2011 | Allen et al. |
| 7,918,215 | B2 | 4/2011 | Martin et al. |
| 7,946,809 | B2 | 5/2011 | Meier et al. |
| 7,987,599 | B2 | 8/2011 | Mavrosakis |
| 8,011,885 | B2 | 9/2011 | Purdey |
| 8,016,554 | B2 | 9/2011 | Ward |
| 8,087,088 | B1 | 12/2011 | Pennington et al. |
| 8,118,570 | B2 | 2/2012 | Meacham et al. |
| 8,157,516 | B2 | 4/2012 | Chen et al. |
| 8,157,543 | B2 | 4/2012 | Shimizu |
| 8,162,602 | B2 | 4/2012 | Caucheteux et al. |
| 8,162,604 | B2 | 4/2012 | Kühnel et al. |
| 8,166,746 | B2 | 5/2012 | Heyerman |
| 8,181,632 | B2 | 5/2012 | Ueno et al. |
| 8,186,886 | B2 | 5/2012 | McKeirnan, Jr. |
| 8,226,296 | B2 | 7/2012 | Larue |
| 8,234,867 | B2 | 8/2012 | Palazzolo et al. |
| 8,240,921 | B2 | 8/2012 | Böning et al. |
| 8,241,006 | B2 | 8/2012 | Renett |
| 8,328,509 | B2 | 12/2012 | Gee et al. |
| 8,328,535 | B2 | 12/2012 | Anschel et al. |
| 8,339,122 | B2 | 12/2012 | Cox et al. |
| 8,348,595 | B2 | 1/2013 | Koch et al. |
| 8,353,666 | B2 | 1/2013 | Masson et al. |
| 8,360,730 | B2 | 1/2013 | Chen et al. |
| 8,372,335 | B2 | 2/2013 | Claude et al. |
| 8,376,721 | B2 | 2/2013 | Thayer et al. |
| 8,398,363 | B2 | 3/2013 | Mundinger et al. |
| 8,419,350 | B2 | 4/2013 | Just |
| 8,449,190 | B2 | 5/2013 | Larue |
| 8,454,242 | B2 | 6/2013 | Mavrosakis |
| 8,464,528 | B2 | 6/2013 | Sausse et al. |
| 8,464,777 | B2 | 6/2013 | Zhu et al. |
| 8,465,261 | B2 | 6/2013 | Holzschuh |
| 8,496,452 | B2 | 7/2013 | Marsal et al. |
| 8,517,665 | B2 | 8/2013 | Lugo et al. |
| 8,517,679 | B2 | 8/2013 | Schlienger et al. |
| 8,545,172 | B2 | 10/2013 | Severin et al. |
| 8,568,092 | B2 | 10/2013 | Matsuyama |
| 8,572,963 | B2 | 11/2013 | Cuniberti et al. |
| 8,602,655 | B2 | 12/2013 | Tabata |
| 8,621,863 | B2 | 1/2014 | Krätschrner et al. |
| 8,622,691 | B2 | 1/2014 | Eguchi et al. |
| 8,628,247 | B2 | 1/2014 | Uesugi |
| 8,636,413 | B2 | 1/2014 | Fiedler et al. |
| 8,641,380 | B2 | 2/2014 | McKenzie |
| 8,641,382 | B2 | 2/2014 | Weber et al. |
| 8,668,432 | B2 | 3/2014 | Sebald et al. |
| 8,696,316 | B2 | 4/2014 | Decker et al. |
| 8,702,394 | B2 | 4/2014 | Decker et al. |
| 8,727,716 | B2 | 5/2014 | Clements et al. |
| 8,734,130 | B2 | 5/2014 | Meacham et al. |
| 8,736,393 | B2 | 5/2014 | Herault et al. |
| 8,740,465 | B2 | 6/2014 | McKeirnan, Jr. |

(56) References Cited

U.S. PATENT DOCUMENTS

| | | |
|---|---|---|
| 8,763,393 B2 | 7/2014 | Severin et al. |
| 8,764,296 B2 | 7/2014 | Omori |
| 8,764,376 B2 | 7/2014 | Lei et al. |
| 8,764,388 B2 | 7/2014 | Roberts et al. |
| 8,790,066 B2 | 7/2014 | Gutknecht |
| 8,790,574 B2 | 7/2014 | Toda et al. |
| 8,794,905 B2 | 8/2014 | Matsuyama |
| 8,807,840 B2 | 8/2014 | House et al. |
| 8,814,538 B2 | 8/2014 | House et al. |
| 8,827,638 B2 | 9/2014 | Delitz |
| 8,834,111 B2 | 9/2014 | Holzschuh |
| 8,845,271 B2 | 9/2014 | Woollenweber et al. |
| 8,961,128 B2 | 2/2015 | Mavrosakis et al. |
| 2010/0139270 A1* | 6/2010 | Koch ............... F01D 25/16 60/605.3 |
| 2012/0328418 A1 | 12/2012 | Yang et al. |
| 2013/0000998 A1 | 1/2013 | Trower et al. |
| 2013/0084035 A1* | 4/2013 | Williams ............ F16C 33/6659 384/472 |
| 2013/0180242 A1 | 7/2013 | Lancaster |
| 2013/0202432 A1 | 8/2013 | House et al. |
| 2013/0302159 A1 | 11/2013 | Grussmann et al. |
| 2013/0309072 A1 | 11/2013 | Marsal et al. |
| 2014/0053573 A1 | 2/2014 | Josefczyk et al. |
| 2014/0086731 A1 | 3/2014 | Schmidt et al. |
| 2014/0186095 A1 | 7/2014 | Peters et al. |
| 2014/0358363 A1 | 12/2014 | Mavrosakis et al. |

FOREIGN PATENT DOCUMENTS

| | | |
|---|---|---|
| DE | 102010064047 A1 | 6/2012 |
| EP | 1357278 A2 | 10/2003 |
| EP | 2420660 A1 | 2/2012 |
| GB | 617763 A | 2/1949 |
| GB | 847242 A | 9/1960 |
| GB | 898164 A | 6/1962 |
| JP | 06-012798 U | 2/1994 |
| JP | 08-254106 A | 10/1996 |
| WO | WO 82/0865 A1 | 3/1982 |
| WO | WO 2013/023930 A1 | 2/2013 |
| WO | WO 2014/109849 A1 | 7/2014 |
| WO | WO 2014/165138 A1 | 10/2014 |

\* cited by examiner

TURBOCHARGER AND METHOD

TECHNICAL FIELD

This patent disclosure relates generally to turbochargers and, more particularly, to turbochargers used on internal combustion engines.

BACKGROUND

Internal combustion engines are supplied with a mixture of air and fuel for combustion within the engine that generates mechanical power. To maximize the power generated by this combustion process, the engine is often equipped with a turbocharged air induction system.

A turbocharged air induction system includes a turbocharger having a turbine that uses exhaust from the engine to compress air flowing into the engine, thereby forcing more air into a combustion chamber of the engine than a naturally aspirated engine could otherwise draw into the combustion chamber. This increased supply of air allows for increased fuelling, resulting in an increased engine power output.

In conventional turbochargers, engine oil is provided to lubricate and cool bearings in the bearing housing that rotatably support a turbocharger shaft that transfers power from the turbine to the compressor. In addition to cooling and lubrication, the oil provides dampening for shaft and bearing vibrations when provided in thin films as it passes though control or bearing surfaces. Such dampening, which is sometimes referred to as squeeze film dampening, can provide vibration dampening but is often insufficient to provide sufficient dampening in cartridge style bearings. Typical designs may suspend the bearing arrangement within a bore in a bearing housing and use a pin to prevent rotation of the bearing assembly along with the turbocharger shaft relative to the bearing housing.

SUMMARY

The present disclosure is applicable to turbochargers for use in internal combustion engines. In one embodiment, a turbocharger includes a turbine, a compressor, and a bearing housing forming a bearing bore. A bearing arrangement is disposed between a shaft interconnecting the turbine and compressor wheels, and the bearing housing. The bearing arrangement includes an outer bearing race element that frictionally engages the bearing bore at both ends. At a first end, a bearing retainer that is connected to the bearing housing includes a cylindrical element that extends into the bearing bore and abuts and frictionally engages a first end of the outer bearing race element. The outer bearing race element is otherwise free to rotate within the bearing bore under a rotational motion that is dampened by viscosity of oil films present along bearing surfaces between the outer bearing race element and the bearing bore. In order for oil to gravity scavenge multiple drain holes are located in the outer race to ensure proper oil scavenging at all circumferential orientations of the bearing outer race.

Therefore, in one aspect, the disclosure describes a turbocharger that includes a turbine having a turbine wheel, a compressor having a compressor wheel, and a bearing housing disposed and connected between the turbine and the compressor. The bearing housing forms a bearing bore having a stop surface at one end. A shaft is rotatably disposed within the bearing housing and extends into the turbine and the compressor. The turbine wheel is connected to one end of the shaft and the compressor wheel is connected to an opposite end of the shaft such that the turbine wheel is rotatably disposed in the turbine and the compressor wheel is rotatably disposed in the compressor. A bearing arrangement is disposed between the shaft and the bearing housing, and includes an outer bearing race element disposed in the bearing bore. The outer bearing race element has a hollow cylindrical shape that engages the bearing bore frictionally along a first end and a second end, and an inner bearing race element, which engages the shaft and is rotatably disposed within the outer bearing race element. A bearing retainer has a cylindrical portion extending into the bearing bore and abutting the first end of the outer bearing race element such that, during operation, the outer bearing race element is free to rotate within the bearing bore at a rotational motion that is dampened by a viscosity of oil present at bearing surfaces disposed between the outer bearing race element and the bearing bore.

In another aspect, the disclosure describes a method for rotatably and sealably supporting a shaft within a bearing housing of a turbocharger. The method includes connecting a turbine wheel at one end of the shaft, forming a first roller bearing by engaging a first plurality of rolling elements in a first inner race formed in an inner bearing race element and in a first outer race formed in an outer bearing race element, forming a second roller bearing by engaging a second plurality or rolling elements in a second inner race formed in the inner bearing race element and in a second outer race formed in the outer bearing race element, and engaging the outer bearing race element between a bearing bore formed in the bearing housing and the shaft, which extends through the bearing bore, such that the inner bearing race element rotates with the shaft with respect to the outer bearing race element. The method further includes frictionally engaging the bearing bore with the outer bearing race element along a first end and a second end, and engaging the shaft with an inner bearing race element, which is rotatably disposed within the outer bearing race element. A bearing retainer having a cylindrical portion extending into the bearing bore and abutting the first end of the outer bearing race element is provided. The method also includes allowing the outer bearing race element to rotate within the bearing bore, and dampening a rotation of the outer bearing race element within the bearing bore by providing a squeeze film of oil along bearing surfaces between the outer bearing race element and the bearing bore.

In yet another aspect, the disclosure describes an internal combustion engine having a plurality of combustion chambers formed in a cylinder block, an intake manifold disposed to provide air or a mixture of air with exhaust gas to the combustion chambers, and an exhaust manifold disposed to receive exhaust gas from the combustion chambers. The engine further includes a turbine having a turbine housing surrounding a turbine wheel, the turbine housing being fluidly connected to the exhaust manifold and disposed to receive exhaust gas therefrom to drive the turbine wheel, a compressor having a compressor housing that surrounds a compressor wheel, the compressor housing being fluidly connected to the intake manifold and disposed to provide air thereto, and a bearing housing disposed and connected between the turbine and the compressor. The bearing housing forms a bearing bore therethrough that accommodates a shaft interconnecting the turbine wheel and the compressor wheel to transfer power therebetween. The shaft is rotatably mounted within the bearing housing and extends into the turbine and the compressor such that the turbine wheel is connected to one end of the shaft and the compressor wheel is connected to an opposite end of the shaft. A bearing arrangement is disposed between the shaft and the bearing housing. The bearing arrangement includes first and second bearings, each of the first and second bearings formed by a respective first and second plurality of roller elements engaged between a respective first and second inner race and a respective first and second outer race.

In one embodiment, an outer bearing race element is disposed within the bearing bore and forms the respective first and second outer races, and an inner bearing race element forms the respective first and second inner races. The outer bearing race element is disposed in the bearing bore and has a hollow cylindrical shape that engages the bearing bore frictionally along a first end and a second end. A bearing retainer having a cylindrical portion extends into the bearing bore and abuts the first end of the outer bearing race element. The outer bearing race element, during operation, is free to rotate within the bearing bore at a rotational motion that is dampened by a viscosity of oil present at bearing surfaces disposed between the outer bearing race element and the bearing bore.

DETAILED DESCRIPTION

Figure 1:
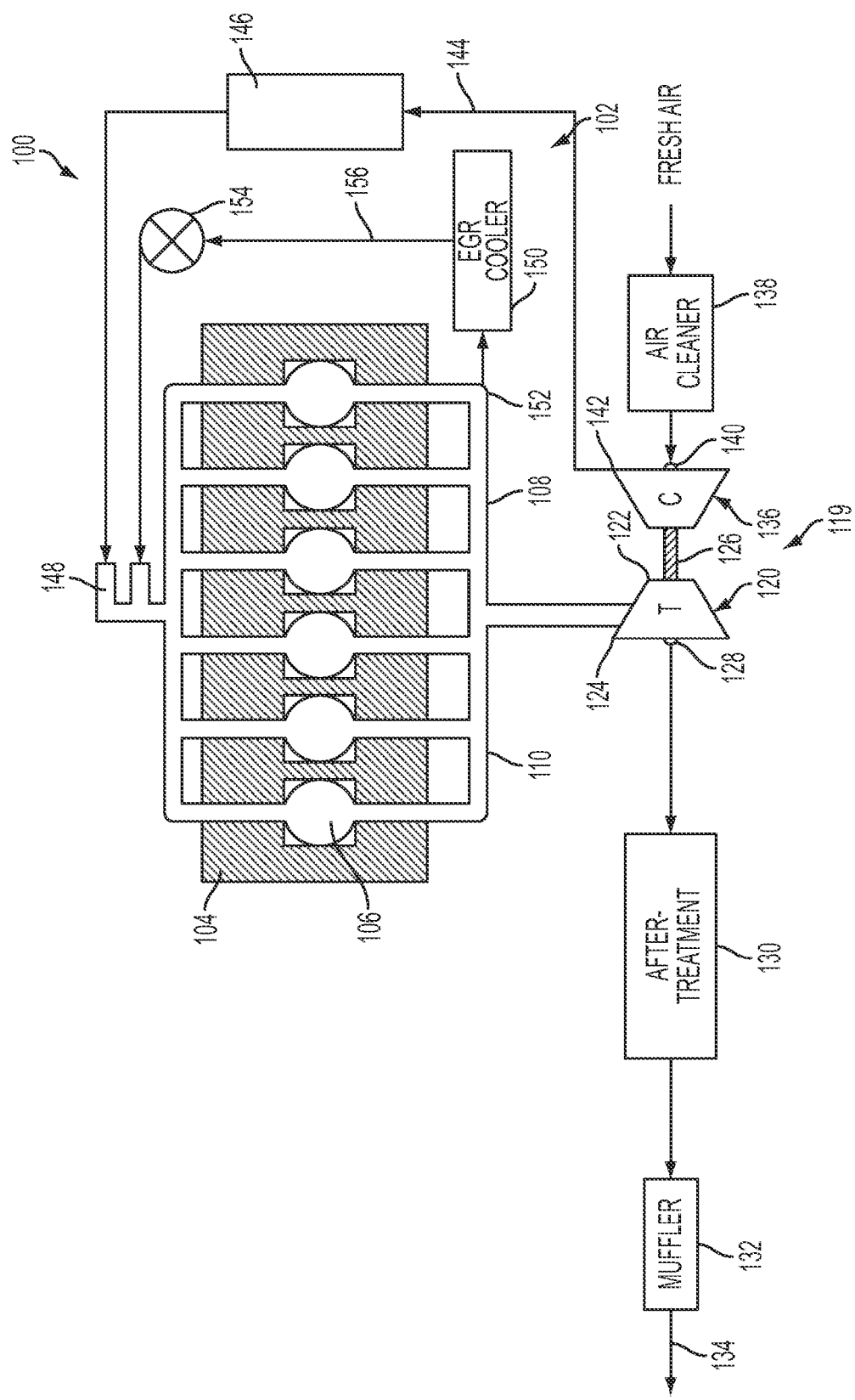
FIG. 1 is a block diagram of an internal combustion engine in accordance with the disclosure.

This disclosure relates to an improved turbocharger used in conjunction with an internal combustion engine to promote the engine's efficient operation and also the robust and reliable operation of the turbocharger. A simplified block diagram of an engine 100 is shown in FIG. 1. The engine 100 includes a cylinder case 104 that houses a plurality of combustion cylinders 106. In the illustrated embodiment, six combustion cylinders are shown in an inline or "I" configuration, but any other number of cylinders arranged in a different configuration, such as a "V" configuration, may be used. The plurality of combustion cylinders 106 is fluidly connected via exhaust valves (not shown) to first exhaust conduit 108 and the second exhaust conduit 110. Each of the first exhaust conduit 108 and the second exhaust conduit 110 is connected to a turbine 120 of a turbocharger 119. In the illustrated embodiment, the turbine 120 includes a housing 122 having a gas inlet 124, which is fluidly connected to the first exhaust conduit 108 and the second exhaust conduit 110 and arranged to receive exhaust gas therefrom. Exhaust gas provided to the turbine 120 causes a turbine wheel (not shown here) connected to a shaft 126 to rotate. Exhaust gas exits the housing 122 of the turbine 120 through an outlet 128. The exhaust gas at the outlet 128 is optionally passed through other exhaust after-treatment components and systems such as an after-treatment device 130 that mechanically and chemically removes combustion byproducts from the exhaust gas stream, and/or a muffler 132 that dampens engine noise, before being expelled to the environment through a stack or tail pipe 134.

Rotation of the shaft 126 causes a wheel (not shown here) of a compressor 136 to rotate. As shown, the compressor 136 can be an axial, radial or mixed flow compressor configured to receive a flow of fresh, filtered air from an air filter 138 through a compressor inlet 140. Pressurized air at an outlet 142 of the compressor 136 is routed via a charge air conduit 144 to a charge air cooler 146 before being provided to an intake manifold 148 of the engine 100. In the illustrated embodiment, air from the intake manifold 148 is routed to the combustion cylinders 106 where it is mixed with fuel and combusted to produce engine power.

An EGR system 102, which is optional, includes an EGR cooler 150, which is also optional, that is fluidly connected to an EGR gas supply port 152 of the first exhaust conduit 108. A flow of exhaust gas from the first exhaust conduit 108 can pass through the EGR cooler 150 where it is cooled before being supplied to an EGR valve 154 via an EGR conduit 156. The EGR valve 154 may be electronically controlled and configured to meter or control the flow rate of the gas passing through the EGR conduit 156. An outlet of the EGR valve 154 is fluidly connected to the intake manifold 148 such that exhaust gas from the EGR conduit 156 may mix with compressed air from the charge air cooler 146 within the intake manifold 148 of the engine 100.

The pressure of exhaust gas at the first exhaust conduit 108, which is commonly referred to as back pressure, is higher than ambient pressure, in part, because of the flow restriction presented by the turbine 120. For the same reason, a positive back pressure is present in the second exhaust conduit 110. The pressure of the air or the air/EGR gas mixture in the intake manifold 148, which is commonly referred to as boost pressure, is also higher than ambient because of the compression provided by the compressor 136. In large part, the pressure difference between back pressure and boost pressure, coupled with the flow restriction and flow area of the components of the EGR system 102, determine the maximum flow rate of EGR gas that may be achieved at various engine operating conditions.

Figure 2:
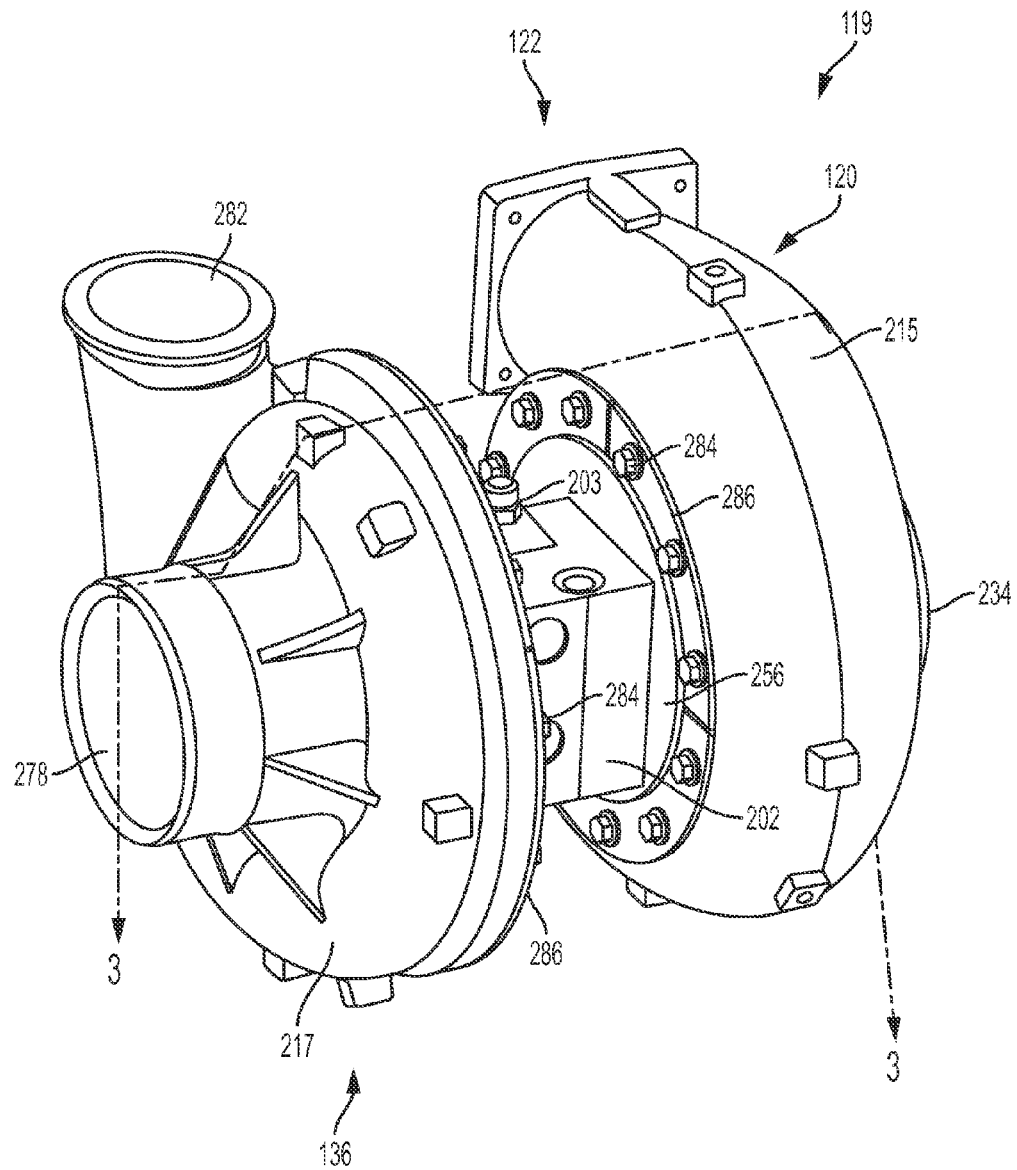
FIG. 2 is an outline view from a side perspective of a turbocharger in accordance with the disclosure.
Figure 3:
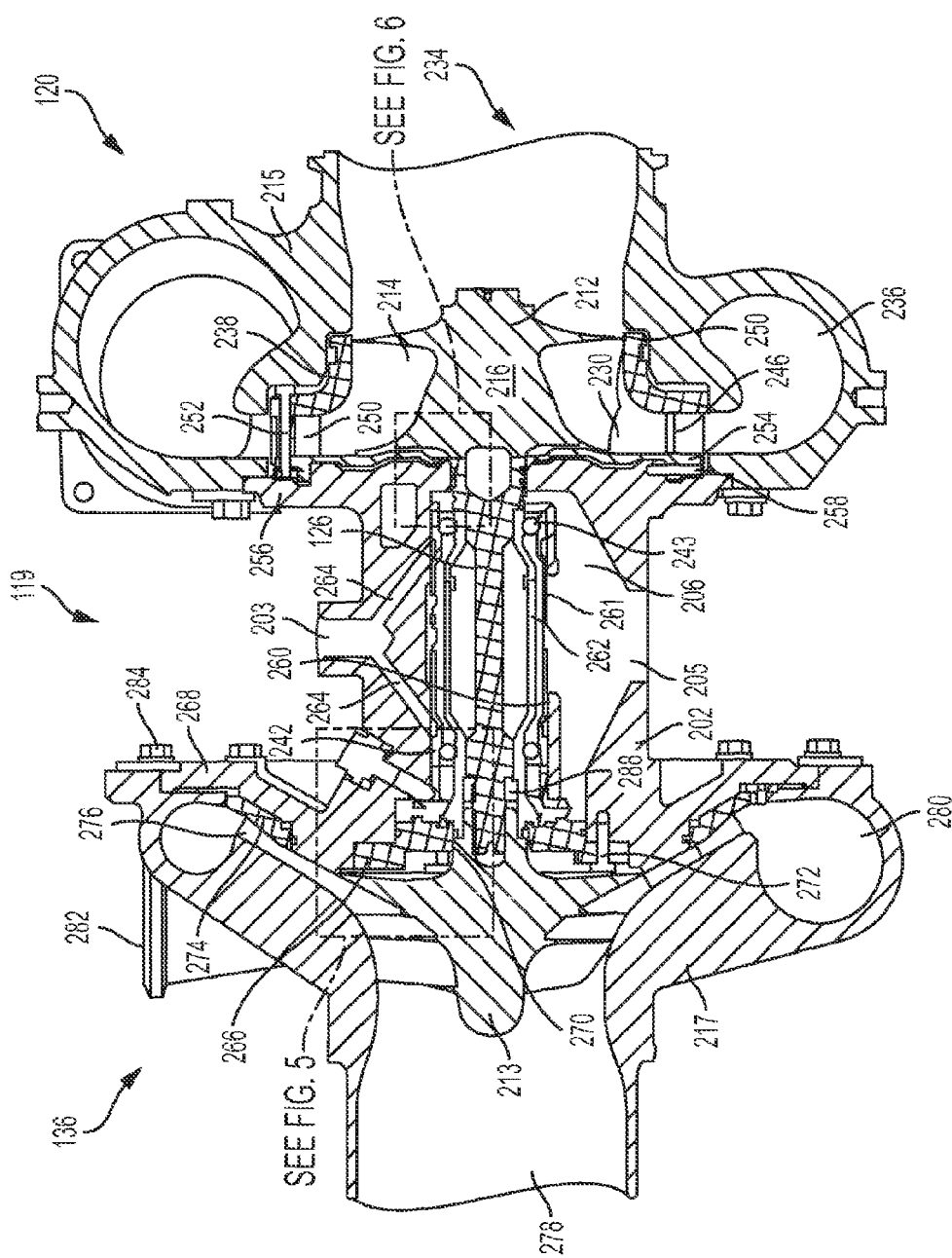
FIG. 3 is a fragmented view through a center of the turbocharger shown in FIG. 2.

An outline view of the turbocharger 119 is shown in FIG. 2, and a fragmented view is shown in FIG. 3. In reference to these figures, and in the description that follows, structures and features that are the same or similar to corresponding structures and features already described may be, at times, denoted by the same reference numerals as previously used for simplicity. As shown, the turbine 120 is connected to a bearing housing 202. The bearing housing 202 surrounds a portion of the shaft 126 and includes bearings 242 and 243 disposed within a lubrication cavity 206 formed within the bearing housing 202. The lubrication cavity 206 includes a lubricant inlet port 203 and a lubricant outlet opening 205 that accommodate a flow of lubrication fluid, for example, engine oil, therethrough to lubricate the bearings 242 and 243 as the shaft 126 rotates during engine operation.

The shaft 126 is connected to a turbine wheel 212 at one end and to a compressor wheel 213 at another end. The turbine wheel 212 is configured to rotate within a turbine housing 215 that is connected to the bearing housing 202. The compressor wheel 213 is disposed to rotate within a compressor housing 217. The turbine wheel 212 includes a plurality of blades 214 radially arranged around a hub 216. The hub 216 is connected to an end of the shaft 126. In the illustrated embodiment, the turbine wheel 212 is connected at the end of the shaft 126 by welding, but other methods, such as by use of a fastener, may be used to connect the turbine wheel to the shaft. The turbine wheel 212 is rotatably disposed between an exhaust turbine nozzle 230 defined within the turbine housing 215. The exhaust turbine nozzle 230 provides exhaust gas to the turbine wheel 212 in a generally radially inward and axial direction relative to the shaft 126 and the blades 214 such that the turbine 120 is a mixed flow turbine, meaning, exhaust gas is provided to the turbine wheel in both radial and axial directions. Exhaust gas passing over the turbine wheel 212 exits the turbine housing 215 via an outlet bore 234 that is formed in the housing. The outlet bore 234 is fluidly connected to the outlet 128 (FIG. 1). The exhaust turbine nozzle 230 is fluidly connected to an inlet gas passage 236 having a scrolled shape and formed in the turbine housing 215. The inlet gas passage 236 fluidly interconnects the exhaust turbine nozzle 230 with the gas inlet 124 (also see FIG. 1). It is noted that a single, inlet gas passage 236 is shown formed in the turbine housing 215 in FIG. 3, but in alternative embodiments separated passages may be formed in a single turbine housing.

In the embodiment shown in FIG. 3, the inlet gas passage 236 wraps around the area of the turbine wheel 212 and outlet bore 234 and is open to the exhaust turbine nozzle 230 around the entire periphery of the turbine wheel 212. A cross sectional flow area of the inlet gas passage 236 decreases along a flow path of gas entering the turbine 120 via the gas inlet 124 and being provided to the turbine wheel 212 through the exhaust turbine nozzle 230.

A radial nozzle ring 238, which also forms a shroud for the turbine wheel 212, is disposed substantially around the entire periphery of the turbine wheel 212. As will be discussed in more detail in the paragraphs that follow, the radial nozzle ring 238 is disposed in fluid communication with the inlet gas passage 236 and defines the exhaust turbine nozzle 230 around the turbine wheel 212. As shown in FIG. 3, the radial nozzle ring forms a plurality of vanes 246, which are fixed and which are symmetrically disposed around the radial nozzle ring 238 and operate to direct exhaust gas form the inlet gas passage 236 towards the turbine wheel 212. The shape and configuration of the plurality of vanes 246 can vary. Flow channels 250 having an inclined shape are defined between adjacent vanes in the first plurality of vanes 246. A flow momentum of gas passing through the flow channels 250 is directed generally tangentially and radially inward towards an inner diameter of the turbine wheel 212 such that wheel rotation may be augmented. Although the vanes 246 further have a generally curved airfoil shape to minimize flow losses of gas passing over and between the vanes, thus providing respectively uniform inflow conditions to the turbine wheel, they also provide structural support to a shroud portion of the radial nozzle ring 238. The radial nozzle ring 238, which includes the shroud portion, is connected to the turbine via a plurality of fasteners 252, but other methods can be used. The fasteners 252 engage a heat shield 254, which is connected to a turbine flange 256 formed on the bearing housing 202 with an interference fit and stakes 258.

The bearing housing 202 encloses a portion of the shaft 126, which is rotationally mounted in a bearing bore 260 formed in the bearing housing by bearings 242 and 243.

Each of the bearings 242 and 243 includes an outer race 261 that engages an inner diameter surface of the bearing bore 260, rollers, and an inner race 262 that has a generally tubular shape and extends around the shaft 126 along its length. Oil from the lubricant inlet port 203 is provided by an external oil pump to the bearings 242 and 243 during operation via passages 264, from where it washes over the bearings to cool and lubricate them before collecting in the lubrication cavity 206 and draining out of the bearing housing through the lubricant outlet opening 205.

Figure 6:
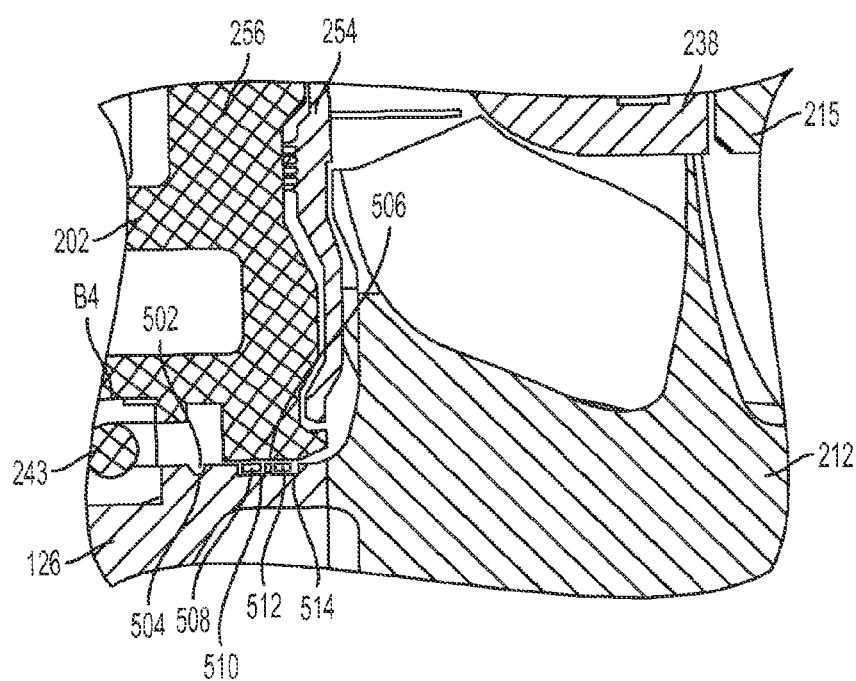

The bearings 242 and 243 are axially retained within the bearing bore 260 by a bearing retainer 266 disposed between a compressor mounting plate 268 formed on the bearing housing 202 and the compressor wheel 213. The bearing retainer 266 forms a central opening 270 having an inner diameter that is smaller than an inner diameter of the bearing bore 260 such that, when the bearing retainer 266 is connected to the bearing housing 202, the bearings 242 and 243 are retained within the bearing bore 260. The bearing retainer 266 is fastened to the compressor mounting plate 268 by fasteners 272, but other fastening or retention structures may be used, and has a cylindrical portion that engages an outer race 261 axially. The engagement between the cylindrical portion (adjacent 288 as shown in FIG. 3) can create, at times, a frictional engagement between the bearing housing and the outer race via the retaining plate that removes the necessity of using structures to otherwise prevent rotation of the outer race such as by use of a radially extending pin or similar structures. To prevent material wear at this interface, a nitride surface treatment may be applied to the annular end face of the bearing retainer 266 that abuts the outer race 261, or a similar anti-wear treatment that can increase material hardness can be used. In the illustrated embodiment, the outer race 261 may in fact rotate relative to the bearing housing, at a rotation rate that is much slower than the shaft, during operation. Such rotation during operation may be dampened by the viscosity of the oil film that is present in the bearing surfaces B1, B2, B3 and B4 (see FIG. 9). A component of this frictional engagement is also provided on a turbine side of the outer race, which abuts a stop surface at the end of the bearing bore 260, as shown in FIG. 6 (stop surface adjacent end of B4), when the turbine is not operating. During operation, a gap of a few thousandths of an inch may form between the outer race and the stop surface that permits oil to pass therethrough.

The compressor 136 includes a compressor vane ring 274 that forms vanes 276 disposed radially around the compressor wheel 213. The vanes 276 fluidly connect a compressor inlet bore 278, which contains the compressor wheel 213, with a compressor scroll passage 280 that is formed in the compressor housing 217 and that terminates to a compressor outlet opening 282. Bolts 284 and circular plate segments 286 connect the turbine housing 215 to the turbine flange 256 and the compressor housing 217 to the compressor mounting plate 268. A nut 288 engaged on the shaft 126 retains the shaft 126 within the bearings 242 and 243.

Figure 4:
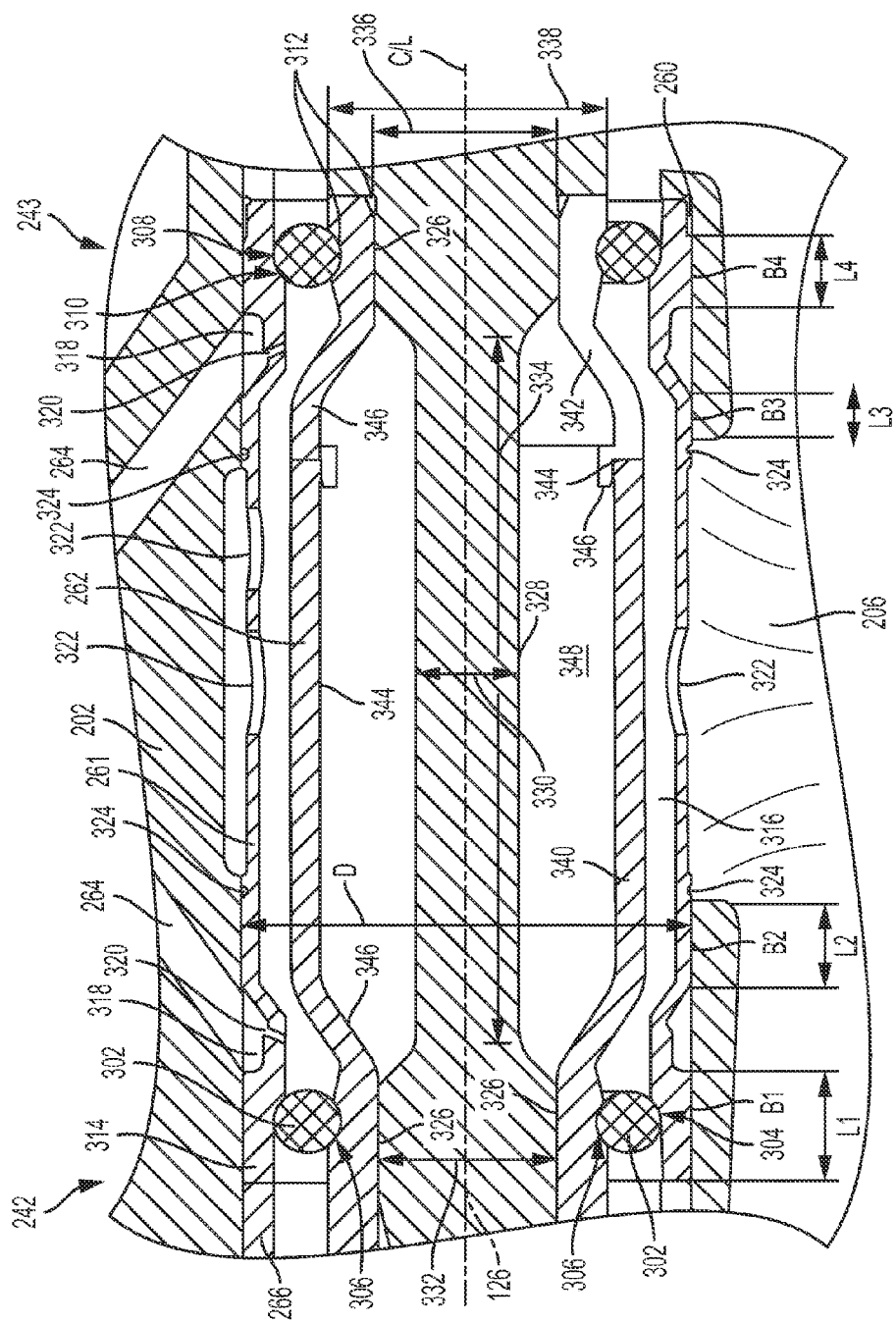
FIG. 4 is an enlarged detail view of the turbocharger bearings shown in FIG. 3.

An enlarged detailed view of the bearings 242 and 243 is shown in FIG. 4. In this illustration, and in the other illustrations that follow, structures that are the same or similar to structures previously described herein will be denoted by the same reference numerals previously used for simplicity. Accordingly, the first bearing 242, which can also be referred to as the compressor-side bearing, is formed by a plurality of roller elements 302 that are confined in rolling or sliding motion between an outer race groove 304, which is formed in the outer race 261, and an inner race groove 306, which is formed close to the compressor-side end of the inner race 262. Similarly, the second bearing 243, which can also be referred to as the turbine-side bearing, is formed by a plurality of roller elements 308 that are confined in rolling or sliding motion between a corresponding outer race groove 310 and inner race groove 312.

The outer race 261 forms various features that facilitate operation of the turbocharger 119 and also promote a desirable flow of lubrication oil through the bearing housing 202. More specifically, the outer race 261 has a generally hollow cylindrical shape that forms an outer wall or outer casing 314. The outer casing 314 forms the outer race grooves 304 and 310 at its ends, and encloses a cylindrical space 316 that surrounds the shaft 126 and inner race 262 during operation. Close to either end, the outer casing 314 forms two oil collection grooves or oil feed galleys 318, each of which is axially aligned with the passages 264 formed in the bearing housing 202 such that, during operation, oil flowing through the passages 264 collects and fills each of the two oil collection grooves or oil feed galleys 318. Lubrication passages 320 extend through the outer casing 314 and fluidly connect each respective oil feed galley 318 with the cylindrical space 316 in an area close to the inner race grooves 306 and 312, and also the outer race grooves 304 and 310, to lubricate and cool the bearings 242 and 243 during operation. The outer casing 314 further forms drainage openings 322 that fluidly connect the cylindrical space 316 with the lubrication cavity 206 to drain out any oil collecting within the outer race 261.

Figure 9:
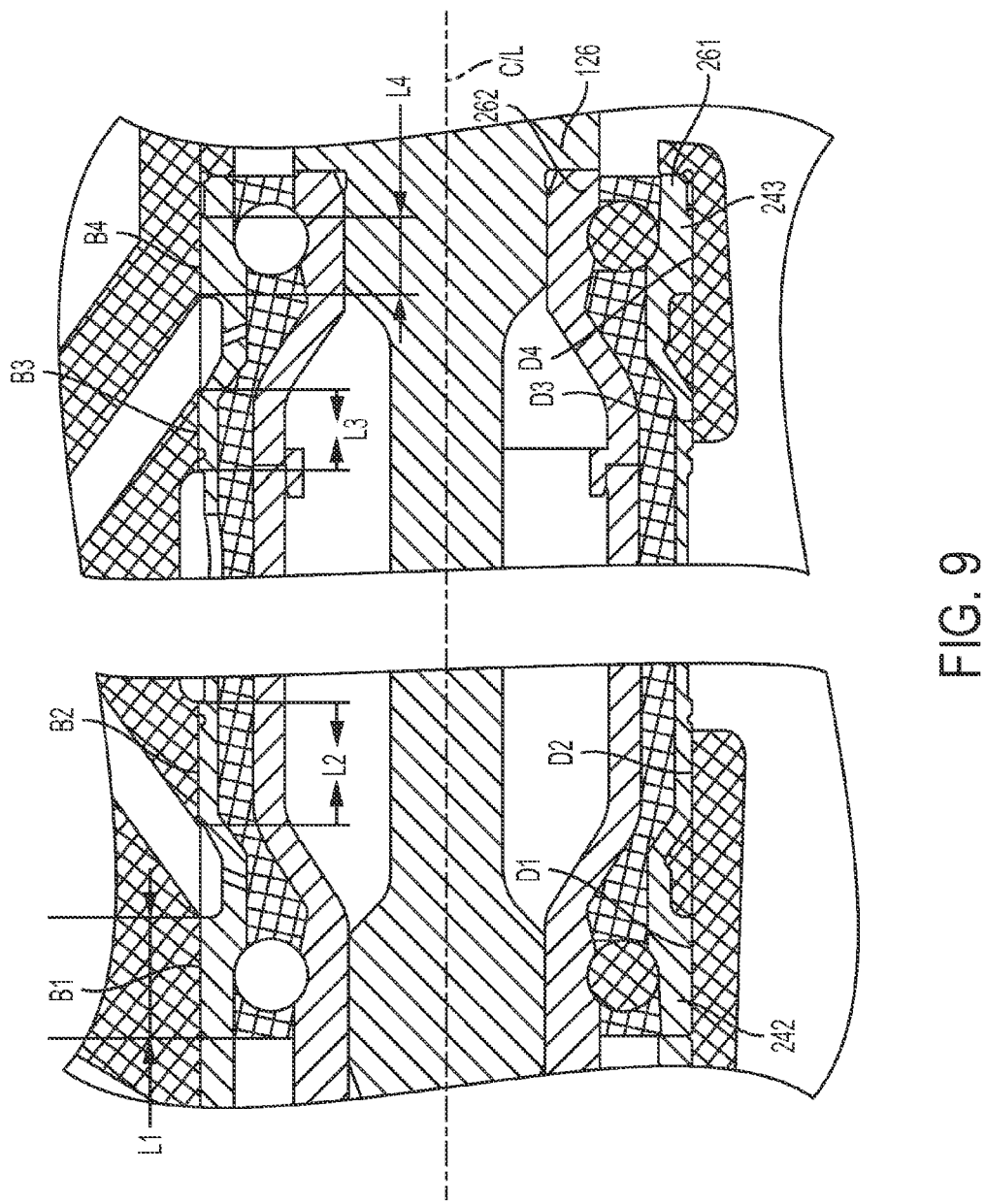
FIG. 9 is a fragmented view of two turbocharger bearings in accordance with the disclosure.

The outer race 261 contacts the bearing bore 260 along four cylindrical bearing surfaces, each of which has a diameter and axial length along a shaft centerline, C/L, that has been designed and selected for optimal bearing and dampening performance during operation. Accordingly, beginning from the compressor side of the outer race 261, a first bearing surface B1 has an outer diameter D1 (see FIG. 9) and extends along an axial length L1. A second bearing surface B2 has a diameter D2 (FIG. 9) and an axial length L2. A third bearing surface B3 has a diameter D3 (FIG. 9) and extends along an axial length L3. Finally, a fourth bearing surface B4 has a diameter D4 (FIG. 9) and extends along an axial length L4. The bearing surfaces are also illustrated in FIG. 9.

Each of the four bearing surfaces B1, B2, B3 and B4 permits a thin film or a squeeze film diameter of oil therein having a thickness equal to a difference between the inner diameter D of the bearing bore 260 and the outer diameters D1, D2, D3 and D4. As shown, the two bearing surfaces B1 and B2 that straddle the compressor-side oil feed galley 318 have the same squeeze film diameter (SFD) and are considered together in terms of axial length (L1+L2). Similarly, the two turbine-side bearing surfaces B3 and B4 have the same SFD and are considered together in terms of axial length (L3+L4). As used herein, SFD is used to refer to those hollow cylindrical areas between each bearing surface and the bearing bore through which oil passes during operation. The thickness of the cylindrical areas or gaps are referred to as SFD clearance, while the length of each cylindrical area (the "height" of the cylindrical area) along the centerline of the shaft is referred to as SFD length.

For the compressor side bearing surfaces, B1 and B2, a ratio of the SFD clearance over the diameter, which can be expressed as $(D_x-D)/D$, is equal to about 0.0021, where "x" is 1 or 2 and denotes D1 or D2. For the same bearing surfaces, the SFD length over the diameter, which can be expressed as $(L1$ or $L2)/D$, is equal to about 0.300. For the turbine side bearing surfaces B3 and B4, a ratio of the SFD clearance over the diameter, which can be expressed as $(D_x-D)/D$, is equal to about 0.0031, where "x" is 3 or 4 and denotes D3 or D4. For the same bearing surfaces, the SFD length over the diameter, which can be expressed as $(L3$ or $L4)/D$, is equal to about 0.200. In other words, in the illustrated embodiment, the cylindrical areas through which oil flows during operation, which can act to dampen shaft vibrations and other excitations, are thinner and longer on the compressor side than on the turbine side, where they are thicker and shorter, thus providing different dampening characteristics.

Figure 8:
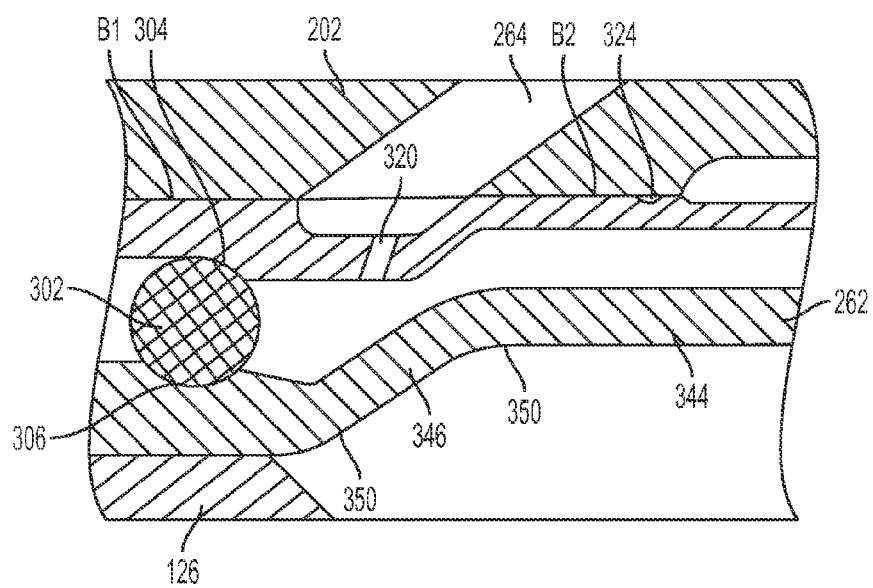
FIG. 8 is an enlarged detail of FIG. 7.

During operation, oil provided through the passages fills and, to a certain extent, pressurizes the oil feed galleys 318. Oil from the oil feed galleys 318 is pushed or passes into the SFDs of the bearing surfaces B1, B2, B3 and B4, such that oil flows out from each oil feed galley 318 towards the compressor on one side, the turbine on an opposite side, and towards the center of the bearing housing on both sides. To promote oil flow through the inner bearing surfaces B2 and B3, the oil flowing towards the center of the bearing housing 202 is collected by drainage grooves 324 (also see FIG. 8), which are formed on an external surface of the outer race 261, and which direct the oil into the lubrication cavity 206.

The outer race 261 surrounds the inner race 262, which in turn surrounds a portion of the shaft 126. The inner race 262 forms two end portions 326 having a reduced diameter portion that engages the ends of the shaft 126. The shaft 126 includes a slender portion 328 having a reduced outer diameter 330, which is smaller than an increased outer diameter 332 at the ends of shaft 126. The slender portion 328 extends over an axial length 334. The increased outer diameter 332 of the shaft 126 mates at its ends with a reduced inner diameter 336 of the two end portions 326 of the inner race 262.

To provide torsional and bending rigidity to the shaft 126, the inner race 262 is advantageously flared along a middle portion thereof to form an increased inner diameter 338. The increased inner diameter 338 overlaps in an axial direction with the slender portion 328 to increase the bending stiffness of the combined structure of the shaft 126 and inner race 262 without considerably increasing the overall mass of the system. In the illustrated embodiment, to facilitate assembly, the inner race 262 is formed by two components, a compressor-side cup 340 and a turbine-side cup 342. One of the cups, in this case the turbine-side cup 342, forms a ledge and a wall that accepts therein the free, annular face of the compressor-side cup 340. Together, the compressor-side cup 340 and the turbine-side cup 342 form the inner race 262 that has a central, flared portion 344 and two transition portions 346 connecting the flared portion 344 with the two end portions 326. Smooth or chamfered transitions 350, which avoid stress concentration, are provided between the end portions, the transition portions 346, and the flared portion 344, as shown in the enlarged detail of FIG. 8. In the illustrated embodiment, each chamfered transition 350, which can be convex or concave, is formed at the same radius, but different radii can be used.

Figure 5:
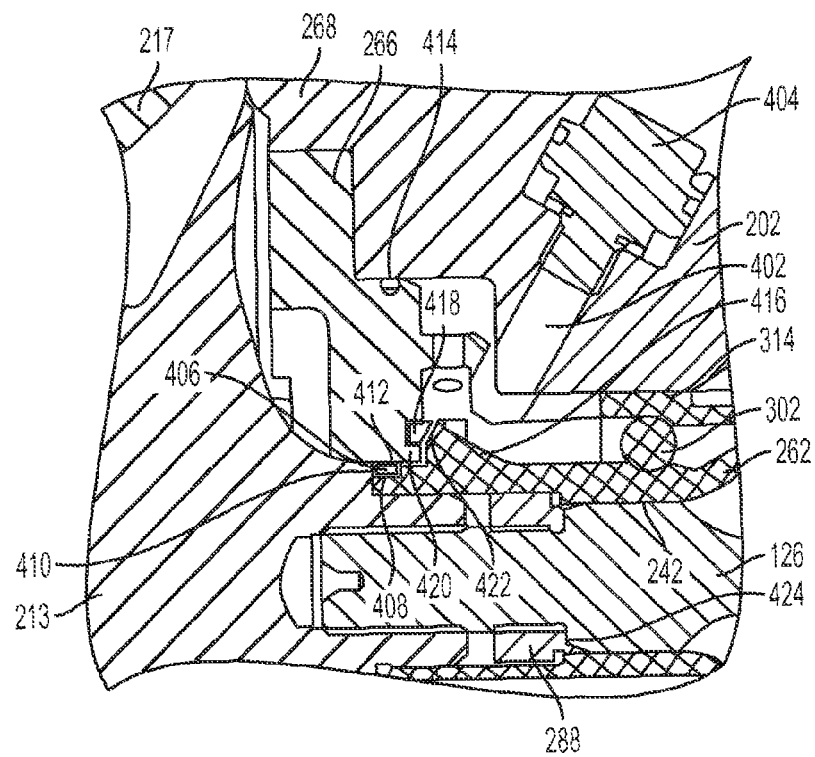
FIGS. 5 and 6 are enlarged detailed views of seals at both ends of the shaft of the turbocharger shown in FIG. 3.

An enlarged detail view of an interface between the compressor wheel 213 and the shaft 126 is shown in FIG. 5. In this figure, a diagnostic passage 402 formed in the bearing housing 202 can be seen. The diagnostic passage 402 is plugged with a plug 404, which can be removed during service provide access, for example, to the interior of the bearing housing for installation of instrumentation and/or access to the interior of the bearing housing.

As can also be seen in FIG. 5, a ring seal 406 is disposed to provide a sliding seal between an internal, working chamber of the compressor and the oil cavity of the bearing housing. More specifically, the ring seal 406 is disposed in an open channel 408 that, together with an annular surface 410 on the inner side of the back of the compressor wheel 213, forms a U-shape. The open channel 408 is formed at the end of an extension of the inner race 262 that is disposed on a compressor-side of the bearing 242. The ring seal 406 slidably and sealably engages an inner bore 412 of the bearing retainer 266 such that a sliding seal is provided between the inner race 262 and the bearing retainer 266 that provides sealing against leakage of oil from the bearing housing 202 into the compressor housing 217. In addition, the ring seal 406 provides sealing against pressurized gas from entering the interior of the bearing housing. A bearing retainer seal 414 is disposed between an outer portion of the bearing retainer 266 and the compressor mounting plate 268. It is noted that an interior 348 (FIG. 4) of the inner race 262 is expected to be generally free of oil as no entry openings for oil are provided except, perhaps, the interface between the compressor-side cup 340 and the turbine-side cup 342. In the event of turbocharger failure, in a condition when the shaft 126 may be pulled towards the turbine housing, the retention nut 288 may be pulled towards and sealably engage a seat 424, to keep the piston rings engaged and retain the turbine wheel and shaft assembly within the bearing housing.

In the illustrated embodiment, a tortuous path is also provided to discourage oil flow towards the ring seal 406. As shown, the end of the inner race 262 forms a radially outward extending portion 416 that slopes away from the shaft 126. The outward extending portion forms an outer tip portion 418 that is shaped as a cylindrical wall extending towards the compressor. The bearing retainer 266 forms an inwardly facing cylindrical wall 420 that is axially aligned with the outer tip portion 418 and disposed radially inward therefrom such that a meandering or tortuous path 422 is formed therebetween leading up to the ring seal 406.

An enlarged detail view of an interface between the turbine wheel 212 and the bearing housing 202 is shown in FIG. 5. In this figure, a drainage groove 502 is formed towards an end 504 of the shaft 126 to facilitate drainage of oil passing through the innermost bearing surface B4 into the scavenge oil gallery. To seal against leakage of oil, and to provide sealing against pressurized gas from entering the interior of the bearing housing, two ring seals are provided between the shaft 126 and an inner bore 506 of the turbine flange 256. More specifically, a first ring seal 508 is disposed in a channel 510 formed in the shaft 126, and a second ring seal 512 is disposed in a channel 514, which is also formed in the shaft 126.

During operation, oil from within the bearing housing 202 is discouraged from leakage into the working chamber of the turbine by the sliding and sealing contact of the first ring seal 508 and the second ring seal 512 with the shaft 126 and the inner bore 506 of the turbine flange 256. It is noted that, in the event of a failure in the turbocharger during which the shaft 126 may displace towards the turbine, at least the first ring seal 508 can axially displace within the inner bore 506 for a predetermined distance while still maintaining contact therewith to provide a seal even under a failure mode, to avoid leakage of oil into the turbine housing. The same sliding tolerance is provided in the even the shaft 126 displaces towards the compressor, in which case the second ring seal 512 can displace within the inner bore 506 while still maintaining its sealing function. The ring seals shown herein are advantageously made of a hardened material such as M2 Steel having a yield stress of about 3,247 MPa (471,000 ksi) and can withstand temperature differences between the ring and surrounding components of about 450 deg. F. In each instance, the rings have a rectangular cross section, but other cross sections can be used, and have a C-shape that can be installed in a channel formed in a shaft to provide a spring-load against a sealably sliding surface that the ring engages.

Figure 7:
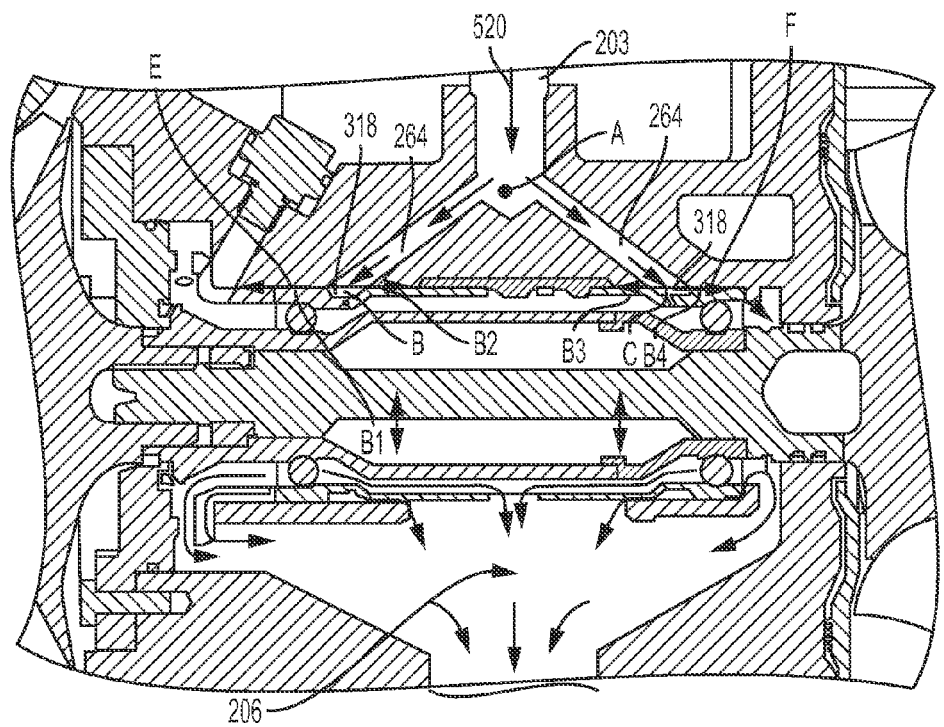
FIG. 7 is an illustration of the fragmented view of FIG. 3 showing flow paths of oil through the bearing housing of the turbocharger shown in FIG. 2.

A simplified oil flow diagram is shown in FIG. 7, where the structures shown in FIG. 4 are used for illustration of the flow paths. In one embodiment, a main oil flow 519 is provided at the lubricant inlet port 203. At a point A, the supply pressure and flow of oil splits into the passages 264 to reach the oil feed galleys 318. Point B is taken to describe oil pressure in the oil feed galley 318 disposed on the compressor side (left side of the figure), and point C is taken to describe oil pressure in the oil feed galley 318 disposed on the turbine side (right side of the figure). Oil from the oil feed galleys 318 passes through the bearing surfaces as previously described, and drains into the lubrication cavity 206. For purpose of description, point E is taken in bearing B1, and point F is taken in bearing B4. Table 1 below illustrates oil flow rates in gallons per minute (GPM) at different operating pressures (low, medium and high, depending on engine speed), and temperatures (cold and hot oil), which are representative of typical engine operating conditions:

TABLE 1

Oil Flow Data (GPM)

| Point | Hot Oil Low Pressure | Hot Oil Medium Pressure | Cold Oil High Pressure |
|---|---|---|---|
| A | 0.9 | 1.6 | 0.040 |
| B | 0.2 | 0.3 | 0.003 |
| C | 0.2 | 0.3 | 0.004 |
| D | 0.1 | 0.2 | 0.001 |
| E | 0.8 | 0.2 | 0.001 |

As can be seen from the above table, the larger gap at point E accounts for more flow of oil towards the turbine, which promotes more effective cooling. In the above table, hot oil can be anywhere within a normal oil temperature operating range for an engine such as between 190 and 230 deg. F., and cold oil can be anywhere in a cold start engine operating range such as between −30 and 0 deg. F. Similarly, low pressure can be between 20 and 40 PSI, medium pressure can be between 50 and 75 PSI, and high pressure can be between 90 and 120 PSI.

As discussed above, oil passing through the bearing surfaces B1 and B2 on the compressor side, and bearing surfaces B3 and B4 on the turbine side (see FIG. 9), help dampen vibrations and imbalances during operation. Such imbalances are advantageously controlled by selecting different oil film thicknesses on both sides of the shaft, which control the shaft dynamics to have natural vibration frequencies beyond the operating range of the engine. For example, for an engine operating at higher speeds and loads, the natural vibration frequencies or at least their prevalent harmonics are configured to occur above or below the expected range of engine operation. In the present embodiment, the difference between D1 and D2 with D3 and D4 in the bearing surfaces B1, B2, B3 and B4 produce the desired characteristics.

Figure 10:
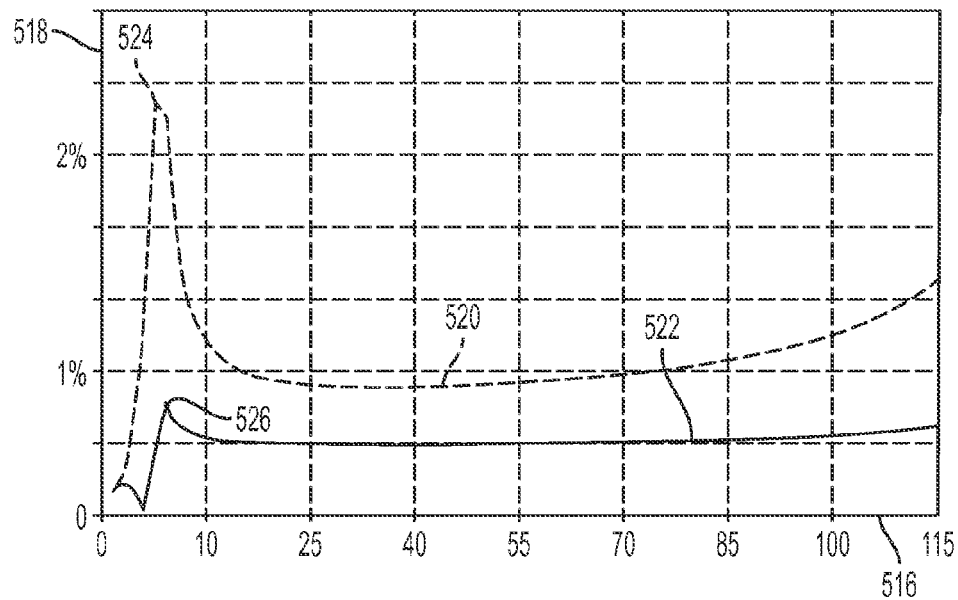
FIGS. 10 and 11 are graphical representations of rotodynamics for a turbocharger in accordance with the disclosure.
Figure 11:
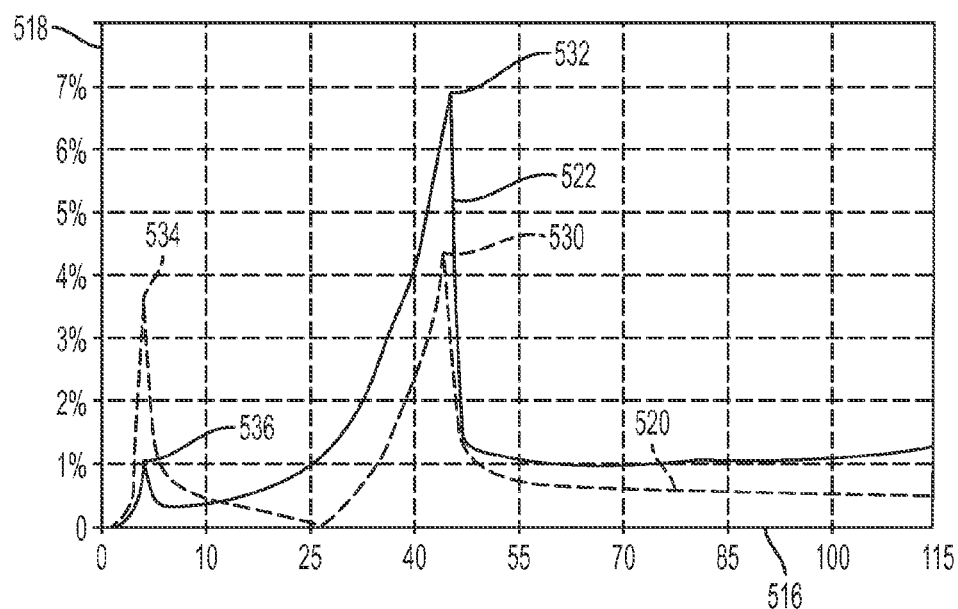

FIGS. 10 and 11 show graphical representations of the vibration characteristics of a turbocharger in accordance with the present disclosure, which was operated to sweep shaft rotation speeds using both hot oil, for example, oil at a normal operating temperature, and cold oil. As can be seen from the above table, the amount of oil flowing through the bearing areas, and also its viscosity, will change with temperature thus yielding different dampening characteristics against vibration. The vibration characteristics can be quantified from many different aspects, including a shaft displacement as a percentage of the displacement measured, observed or expected with respect to the bearing diameter at the bearing areas, averaged over the four bearing areas.

The results of a shaft speed sweep on shaft displacement using hot oil are shown in FIG. 10, where shaft speed 516, as a percentage of maximum speed, is plotted along the horizontal axis, and percentage displacement 518, expressed in (%), of a displacement distance with respect to the bearing diameter, is plotted along the vertical axis. Two curves are shown, the dashed lines representing a compressor response curve 520 and the solid line representing a turbine response curve 522. The compressor response curve 520 represents a collection of points showing the percentage displacement 518 of each test point and the corresponding shaft speed 516 over a range of shaft speeds taken at the compressor wheel (e.g., compressor wheel 213, FIG. 3). Similarly, the turbine response curve 522 represents a collection of points showing the percentage displacement 518 of each test point and the corresponding shaft speed 516 over a range of shaft speeds taken at the turbine wheel (e.g., turbine wheel 212, FIG. 3). The same curves plotted against the same parameters, but for cold oil, are shown in FIG. 11

As can be seen from the graphs in FIGS. 10 and 11, when the lubricating oil is warm, a peak vibration of just over 2% can occur at the compressor wheel speed below 10% of the maximum speed, as denoted by point 524 on the graph, and at about that same shaft speed, a vibration with a much lower displacement percentage of about 0.5% can occur at the turbine wheel, as denoted by point 526. As can be seen by the compressor response curve 520 in FIG. 10, the percent displacement over a range of shaft speeds between 10% and about 85% of maximum speed, which accounts for most of the engine's operating range, remains constant at less than 1% for the compressor wheel. The turbine response curve 522 shows even better vibration profiles of a relatively constant peak displacement of less than 0.5% over a speed range between 10% and 100% of the maximum speed.

When the lubricating oil is cold, as shown in FIG. 11, a peak vibration of about 7% can occur at the turbine wheel at around 50%, as denoted by point 532 on the graph, and at about that same shaft speed, a vibration with a much lower displacement percentage of about 4.4% can occur at the compressor wheel, as denoted by point 530. At a speed of about 5%, similar peaks as those seen in the hot oil condition (FIG. 10) can be seen, with the compressor wheel having a peak displacement percentage of about 3.5%, as denoted by point 534, and the turbine wheel having a peak displacement percentage of about 1%, as denoted by point 526. In both cases, the peak displacement at the 5% speed with cold oil is about double that of hot oil.

As the shaft speed increases, still using cold oil (FIG. 11), the percent displacement over a range of shaft speeds between 55% and about 115%, which accounts for most of the engine's operating range, remains constant at less than 1% for the turbine wheel. The compressor response curve 520 shows even better vibration profiles of a relatively constant peak displacement of about than 0.5% over a range between 55% and 115%. With these vibration profiles, shaft roto-dynamics is acceptable until the oil warms up, and then settles to a low peak displacement of less than 1% over the expected engine operating range. It is noted that, on the graphs of FIGS. 10 and 11, idle engine speed may be about 10% of the ranges shown in the chart.

Figure 12:
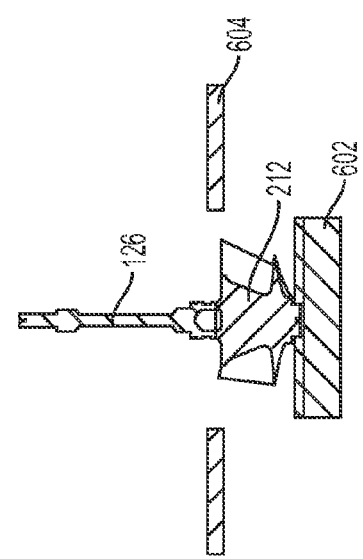
FIGS. 12-15 are illustrations of a bearing housing assembly process in accordance with the disclosure.
Figure 13:
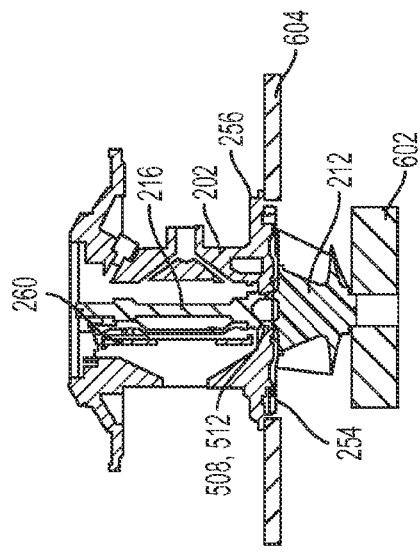

When assembling a turbocharger in accordance with the disclosure, and especially when putting together an assembly of the bearing housing 202, certain process steps may be carried out using a fixture, as shown in FIGS. 12-15. In FIG. 12, an assembly of the turbine wheel 212 welded to an end of the shaft 126 is mounted on a fixture 602 in a vertical position with the turbine wheel at the bottom. After the first ring seal 508 and the second ring seal 512 (FIG. 6) are installed on the shaft, the bearing housing 202, which has the heat shield 254 already installed, is inserted around the shaft 126 until the turbine flange 256 rests on a second fixture 604, thus setting a proper distance between the turbine flange 256 and the turbine wheel 212, as shown in FIG. 13.

Figure 14:
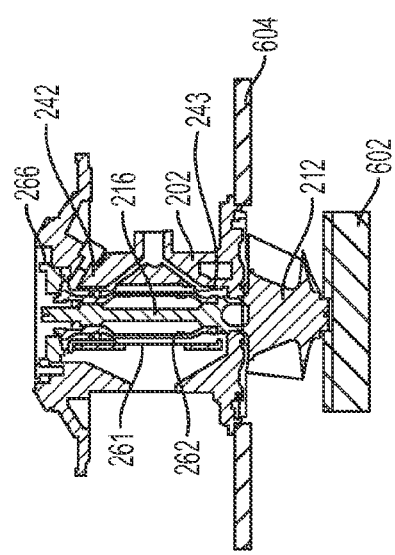
Figure 15:
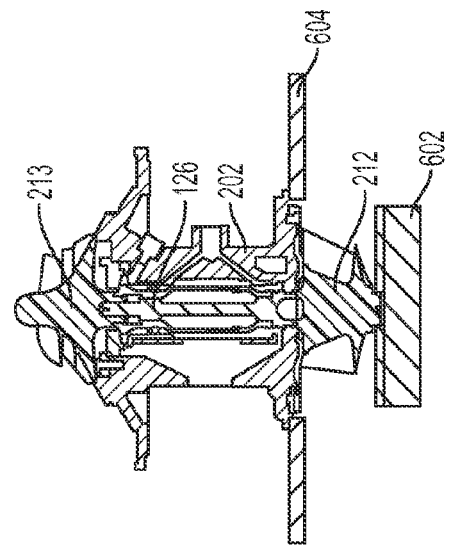

Various components including the outer race 261, inner race 263 and bearings 242 and 243 are inserted into the bearing bore 260 around the shaft 126 and, after various seals are installed, the bearing retainer 266 is assembled to close the bearing housing 202 and set a proper concentricity between the shaft 126 and the bearing bore 260, as shown in FIG. 14. The compressor wheel 213 is then installed on the free end of the shaft 126, as shown in FIG. 15. In the illustrated assembly sequence, the subassembly of the turbine wheel 212 onto the end of the shaft 126 may be rotationally balanced before assembly of the turbine is undertaken such that the shaft can determine the concentricity of the remaining components assembled thereafter, including the compressor wheel 213, to maintain a balanced assembly. As an optional step, the entire assembly may be trim balanced after assembly to reduce imbalances, especially those imbalances that may be present when operating with cold oil. Trim balancing may be accomplished by removing material from the compressor wheel at the central hub and/or at the tips of the compressor blades. To determine the amount of material to be removed and the location for such removal, the entire assembly may be placed on a rotation balancing machine. It is further noted that the engagement of the radial seal within the inner bore of the bearing retainer, which helps place the shaft concentrically into the bearing bore, also reduces the amount of material that must be removed to balance the assembly when compared to turbochargers having a different sealing arrangement than what is shown herein.

INDUSTRIAL APPLICABILITY

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:

1. A turbocharger, comprising:
   a turbine that includes a turbine wheel;
   a compressor that includes a compressor wheel;
   a bearing housing disposed and connected between the turbine and the compressor, the bearing housing forming a bearing bore having a stop surface defined at one end;
   a shaft rotatably disposed within the bearing housing and extending into the turbine and the compressor, wherein the turbine wheel is connected to one end of the shaft and wherein the compressor wheel is connected to an opposite end of the shaft such that the turbine wheel is rotatably disposed in the turbine and the compressor wheel is rotatably disposed in the compressor;
   a bearing arrangement disposed between the shaft and the bearing housing, the bearing arrangement including an outer bearing race element disposed in the bearing bore, wherein the outer bearing race element has a hollow cylindrical shape that engages the bearing bore frictionally along a first end, and an inner bearing race element, which engages the shaft and is rotatably disposed within the outer bearing race element, wherein the outer race elements extends to roller elements located on the compressor side to roller elements located on the turbine aide, and wherein the inner bearing race element forms a flared portion having an increased inner diameter with respect to end portions thereof that engage the shaft;
   a bearing retainer having a cylindrical portion extending into the bearing bore and abutting the first end of the outer bearing race element wherein the bearing retainer further forms an inner bore adjacent the first end, where the inner bore has an inner diameter that is smaller than a diameter of the bearing bore;
   wherein the outer bearing race element, during operation, is free to rotate within the bearing bore at a rotational motion that is dampened by a viscosity of oil present at bearing surfaces disposed between the outer bearing race element and the bearing bore;
   wherein, during operation, the outer bearing race element floats along first, second, third and fourth bearing surfaces, each carrying a respective squeeze film diameter (SFD)of oil that operates to dampen radial vabrations of the shaft and the outer bearing race element and also operates to dampen the rotation of the outer race element; and
   wherein multiple drain holes are formed in the outer bearing race element, which operate to provide sufficient oil scavenging at all circumferential orientations relative to the outer bearing race element.

2. The turbocharger of claim 1 wherein inner bearing race element forms an extension that includes a channel into which a ring seal is disposed, wherein the ring seal sealably and slidably engages the inner bore of the bearing retainer to form a seal.

3. The turbocharger of claim 1, further including a nut fastening the shaft with the inner bearing race element.

4. The turbocharger of claim 3, wherein a force tending to pull the shaft towards the turbine is transferred, through the shaft, the nut and the inner bearing race element to the outer bearing race element and to an interface between the second end and the stop surface.

5. The turbocharger of claim 1, wherein the shaft is connected to the inner bearing race element at end portions, the end portions having a first diameter, the shaft further forming a slender portion between the end portions, the slender portion having a second diameter that is less than the first diameter.

6. The turbocharger of claim 5, wherein the increased inner diameter of the inner bearing race element overlaps in an axial direction with the slender portion of the shaft.

7. The turbocharger of claim 1, wherein the inner bearing race element is formed by two components, a compressor-side cup and a turbine-side cup, and wherein a nut engages the compressor-side cup to the shaft.

8. A method for rotatably and sealably supporting a shaft within a bearing housing of a turbocharger, comprising:
   connecting a turbine wheel at one end of the shaft;
   forming a first roller bearing by engaging a first plurality of rolling elements in a first inner race formed in an inner bearing race element and in a first outer race formed in an outer bearing race element;
   forming a second roller bearing by engaging a second plurality or rolling elements in a second inner race formed in the inner bearing race element and in a second outer race formed in the outer bearing race element;
   engaging the outer bearing race element between a bearing bore formed in the bearing housing and the shaft, which extends through the bearing bore, such that the inner bearing race element rotates with the shaft with respect to the outer bearing race element;
   frictionally engaging the bearing bore with the outer bearing race element along a first end and a second end, and
   engaging the shaft with an inner bearing race element, which is rotatably disposed within the outer bearing race element;
   providing a bearing retainer having a cylindrical portion extending into the bearing bore and abutting the first end of the outer bearing race element;
   allowing the outer bearing race element to rotate within the bearing bore;
   stiffening an assembly that includes the inner bearing race element and the shaft by providing a flared portion having an increased inner diameter on the inner bearing race element with respect to end portions thereof that engage the shaft:
   wherein, during operation, the outer bearing race element floats along first, second, third and fourth bearing srfaces, each carrying a respective squeeze film diameter (SFD) of oil that operates to dampen radial vibrations of the shaft and the outer bearing race element; and
   dampening a rotation of the outer bearing race element within the bearing bore by providing a squeeze film of oil along bearing surfaces between the outer bearing race element and the bearing bore.

9. The method of claim 8, wherein the bearing retainer further forms an inner bore adjacent the first end, which inner bore has an inner diameter that is smaller than a diameter of the bearing bore.

10. The method of claim 9, wherein inner bearing race element forms an extension that includes a channel into which a ring seal is disposed, wherein the ring seal sealably and slidably engages the inner bore of the bearing retainer to form a seal.

11. The method of claim 8, further including a nut fastening the shaft with the inner bearing race element.

12. The method of claim 3, wherein a force tending to pull the shaft towards the turbine is transferred, through the shaft, the nut and the inner bearing race element to the outer bearing race element and to an interface between the second end and the stop surface, thus increasing a magnitude of the frictional engagement therebetween.

13. The method of claim 8, wherein the shaft is connected to the inner bearing race element at end portions, the end portions having a first diameter, the shaft further forming a slender portion between the end portions, the slender portion having a second diameter that is less than the first diameter.

14. The method of claim 13, wherein the increased inner diameter of the inner bearing race element overlaps in an axial direction with the slender portion of the shaft.

* * * * *